(No Model.)
F. COMMINGE.
NUT LOCK.
No. 541,070. Patented June 18, 1895.
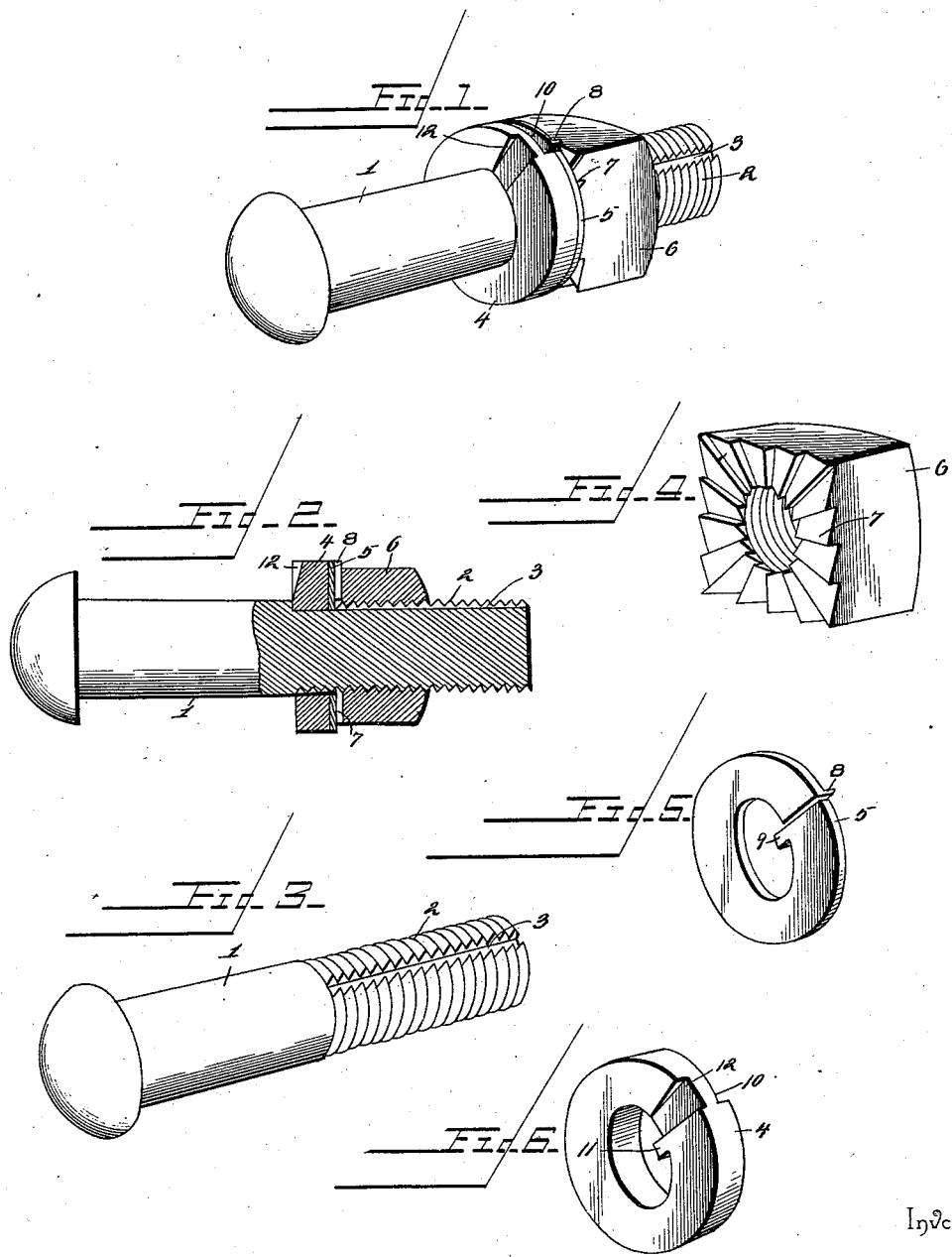
Inventor
Frank Comminge.
Witnesses
By his Attorneys.

UNITED STATES PATENT OFFICE.

FRANK COMMINGE, OF SAN ANTONIO, TEXAS.

NUT-LOCK.

SPECIFICATION forming part of Letters Patent No. 541,070, dated June 18, 1895.

Application filed February 6, 1895. Serial No. 537,500. (No model.)

*To all whom it may concern:*

Be it known that I, FRANK COMMINGE, a citizen of the United States, residing at San Antonio, in the county of Bexar and State of Texas, have invented a new and useful Nut-Lock, of which the following is a specification.

The invention relates to improvements in nut locks.

The object of the present invention is to improve the construction of nut locks, and to provide a simple, inexpensive and efficient one capable of securely locking a nut against accidental rotation, and adapted to be readily applied to single nuts having either right or left hand threads.

A further object of the invention is to provide a nut lock which may be readily operated to release the nut to permit the same to be unscrewed without injuring the nut lock or any of its parts.

The invention consists in the construction and novel combination and arrangement of parts hereinafter fully described, illustrated in the accompanying drawings, and pointed out in the claim hereto appended.

In the drawings, Figure 1 is a perspective view of a nut-lock constructed in accordance with this invention. Fig. 2 is a central longitudinal sectional view. Fig. 3 is a detail perspective view of the bolt. Fig. 4 is a similar view of the nut. Figs. 5 and 6 are detail views of the washers.

Like numerals of reference indicate like parts in all the figures of the drawings.

1 designates a bolt, provided in its threaded portion 2 with a longitudinal groove 3, and having arranged on it inner and outer washers 4 and 5, and adapted to permit a nut 6 to be screwed on it in the usual manner. The nut 6 is provided, on its inner face, with radial series of annularly-disposed shouldered teeth 7, disposed in the opposite direction of the pitch of the threads, and arranged to be engaged by the washer 5, which is split and is provided, at one end, with a tooth 8 for engaging the teeth of the nut. The other end of the split washer is provided with an inward-extending radial tooth or projection 9, fitting in the groove of the bolt and locking the washer 5 against accidental or any other rotation.

The washer 5 is constructed of spring metal, preferably sheet steel, and its toothed end is outwardly offset for engaging the nut, and is located adjacent to a recess 10, in the outer face of the washer 4, and is adapted to be depressed into the recess to disengage the tooth 8 from the nut to permit the latter to be unscrewed.

The washer 4 is a heavy one, constructed of any suitable metal, such as iron or steel, and is provided with a radial projection 11, similar to that of the spring washer, and fitting in the groove of the bolt to lock the heavy inner washer against rotation. At the inner side of the inner washer is located a peripheral recess 12, to permit a pair of pinchers to be readily engaged with the heavy inner washer and the locking end of the spring washer, to depress the outwardly-offset end of the locking washer to free the nut to permit the latter to be unscrewed.

By this construction the nut is securely locked against accidental rotation, and may, by the aid of a pair of pinchers or other tool, be made to release the nut to permit the same to be taken off of the bolt; and it will be seen that the nut lock is exceedingly simple and inexpensive in construction, that it is positive and reliable in its operation, and that, in being released, is in nowise injured.

Changes in the form, proportion, and the minor details of construction may be resorted to without departing from the principle or sacrificing any of the advantages of this invention.

What I claim is—

In a nut lock, the combination of a bolt provided at its threaded portion with a longitudinal groove, the heavy inner washer having a radial projection at its bolt-opening to fit in said groove, and provided at its inner face with a peripheral notch, and having at its outer face a recess, the resilient split locking washer provided at the inner edge of one end with a projection to fit in the groove of the bolt, and having its other end located at said recess and outwardly-bent and provided with a tooth and adapted to be depressed in said recess to disengage the tooth, and a nut arranged on the bolt and provided at its inner face with an annular series of shouldered teeth adapted to be engaged by said tooth, substantially as and for the purpose described.

In testimony that I claim the foregoing as my own I have hereto affixed my signature in the presence of two witnesses.

FRANK COMMINGE.

Witnesses:
C. UPSON,
FRANK BASSHARDT.